(12) United States Patent
Venkayala et al.

(10) Patent No.: US 7,882,127 B2
(45) Date of Patent: Feb. 1, 2011

(54) MULTI-CATEGORY SUPPORT FOR APPLY OUTPUT

(75) Inventors: Sunil Venkayala, Burlington, MA (US); Hankil Yoon, Acton, MA (US)

(73) Assignee: Oracle International Corporation, Redwood Shores, CA (US)

( * ) Notice: Subject to any disclaimer, the term of this patent is extended or adjusted under 35 U.S.C. 154(b) by 125 days.

(21) Appl. No.: 10/419,922

(22) Filed: Apr. 22, 2003

(65) Prior Publication Data
US 2003/0212679 A1   Nov. 13, 2003

Related U.S. Application Data (60) Provisional application No. 60/379,060, filed on May 10, 2002.

(51) Int. Cl.
G06F 7/00 (2006.01)
(52) U.S. Cl. .................. 707/776; 707/737; 707/748
(58) Field of Classification Search .............. 707/6, 707/100, 101, 776, 737, 748
See application file for complete search history.

(56) References Cited

U.S. PATENT DOCUMENTS

| | | | | |
|---|---|---|---|---|
| 6,216,134 B1 * | 4/2001 | Heckerman et al. | ...... | 707/104.1 |
| 6,507,843 B1 * | 1/2003 | Dong et al. | ...... | 707/6 |
| 6,581,058 B1 * | 6/2003 | Fayyad et al. | ...... | 707/6 |
| 6,782,377 B2 * | 8/2004 | Agarwal et al. | ...... | 706/47 |
| 6,804,669 B2 * | 10/2004 | Aggarwal | ...... | 707/6 |
| 6,839,682 B1 * | 1/2005 | Blume et al. | ...... | 705/10 |
| 6,865,573 B1 * | 3/2005 | Hornick et al. | ...... | 707/6 |
| 7,003,476 B1 * | 2/2006 | Samra et al. | ...... | 705/10 |
| 7,020,593 B2 * | 3/2006 | Hong et al. | ...... | 703/2 |
| 7,418,431 B1 * | 8/2008 | Nies et al. | ...... | 706/21 |
| 2002/0019763 A1 * | 2/2002 | Linden et al. | ...... | 705/10 |
| 2002/0059219 A1 * | 5/2002 | Neveitt | ...... | 707/5 |
| 2002/0083067 A1 * | 6/2002 | Tamayo et al. | ...... | 707/100 |
| 2002/0103793 A1 * | 8/2002 | Koller et al. | ...... | 707/3 |
| 2003/0018620 A1 * | 1/2003 | Vishnubhotla | ...... | 707/3 |
| 2003/0018652 A1 * | 1/2003 | Heckerman et al. | ...... | 707/104.1 |
| 2003/0144933 A1 * | 7/2003 | Huang | ...... | 705/35 |

* cited by examiner

*Primary Examiner*—Apu M Mofiz
*Assistant Examiner*—Cindy Nguyen
(74) *Attorney, Agent, or Firm*—Hanify & King, P.C.

(57) ABSTRACT

A system, method, and computer program product provides a multi-category apply operation in a data mining system that produces output with multiple class values, their associated measures including probabilities in case of supervised models, quality of fit and distance in case of clustering models, and the relative ranks of the predictions. A method for multi-category apply in a data mining system comprises the steps of receiving input data for scoring including a plurality of rows of data applied to a data mining model and generating multi-category apply output including a plurality of class values and their associated probabilities based on the received input data, the selected class values having probabilities meeting a selection criterion and their ranks.

28 Claims, 4 Drawing Sheets

Fig. 3

| ATTRIBUTE | TYPE | USAGE |
|---|---|---|
| CUSTOMER_ID | INTEGER | SUPPLEMENTAL |
| FIRST_NAME | STRING | INACTIVE |
| LAST_NAME | STRING | INACTIVE |
| AGE | INTEGER | ACTIVE |
| STREET_ADDRESS | STRING | INACTIVE |
| CITY | STRING | ACTIVE |
| STATE | STRING | ACTIVE |
| COUNTRY | STRING | ACTIVE |
| GENDER | STRING | ACTIVE |
| INCOME | INTEGER | ACTIVE |
| PRODUCT_CATEGORY | INTEGER | TARGET |

Fig. 5

| CUSTOMER_ID | CAR_TYPE1 | PROB1 | CAR_TYPE2 | PROB2 |
|---|---|---|---|---|
| 1001 | Sedan | 0.6 | Light-truck | 0.3 |
| 1002 | SUV | 0.7 | Mini-van | 0.2 |
| 1003 | Light-truck | 0.6 | SUV | 0.3 |
| 1004 | Sedan | 0.5 | Mini-van | 0.4 |
| 1005 | Sedan | 0.6 | SUV | 0.3 |

Fig. 4

MULTI-CATEGORY SUPPORT FOR APPLY OUTPUT

CROSS-REFERENCE TO RELATED APPLICATIONS

The benefit of provisional application 60/379,060, filed May 10, 2002, under 35 U.S.C. §119(e), is hereby claimed.

FIELD OF THE INVENTION

The present invention relates to a system, method, and computer program product that provides a multi-category apply operation in a data mining system that produces output with multiple class values and their associated probabilities.

BACKGROUND OF THE INVENTION

In data mining, supervised learning is a collection of techniques that are used to build a model from a given set of records, known as a training set, whose class values are known a priori. Once the model is built, it is tested against another set of records with known class values, known as a test set, in order to quantify the quality of the model. It is then used to predict (or score) unknown class values of real-world records. This last stage where the model is used for prediction is termed apply. The traditional applications of such supervised learning techniques include retail target marketing, medical diagnosis, weather prediction, credit approval, customer segmentation, and fraud detection. Based on the application, it is required that the result of the apply operation contain various class values and their probabilities, as well as some attributes that can be used to characterize the input records.

In conventional data mining systems, a user can describe the result of apply operation in the form of a database table. The user is allowed to specify the columns of the table. The output columns include the predicted class value and its probability, and source attributes of the input data. Typically, such conventional data mining systems allow the user to select only the class value with the highest probability. In real-world applications, however, the data miner may want to get several class values and their associated probabilities. For example, a need may arise for a recommendation engine to choose 10 items with the highest probabilities in order to provide the customers with appropriate recommendations. Thus, a need arises for a data mining system that provides a multi-category apply operation that produces output with multiple class values and their associated probabilities.

This technique can also be used for unsupervised models such as clustering models. Clustering analysis identifies clusters embedded in the data where a cluster is a collection of records in the data that are similar to one another. Once clusters are identified from a given set of records, one can get predictions for new records on which cluster each record is likely to belong. Such predictions may be associated with probability, the quality of fit, which describes how well a given record fits in the predicted cluster, and the distance from the center of the predicted cluster.

SUMMARY OF THE INVENTION

The present invention is a system, method, and computer program product that provides a multi-category apply operation in a data mining system that produces output with multiple class values and their associated probabilities.

In one embodiment of the present invention, a method for multi-category apply in a data mining system comprises the steps of receiving input data for scoring including a plurality of rows of data applied to a data mining model and generating multi-category apply output with a plurality of predicted class values and their associated probabilities based on the received input data and a selection criterion. The step of generating multi-category apply output may comprise the steps of generating input data tables including active attributes and source attributes, evaluating probabilities of categories of a target attribute to determine those meeting the selection criterion, and generating an output data table including a plurality of class values of the target attribute and their associated probabilities, the selected class values having probabilities meeting the selection criterion.

In one aspect of the present invention, the step of generating multi-category apply output further comprises the steps of receiving the input data for scoring in a transactional format and preparing the input data in the transactional format to generate input data tables including active attributes and source attributes. The method may further comprise the step of validating the received input data to ensure active attributes and a target attribute specified for the data mining model are present in the received input data and the source attributes specified for the multi-category apply output are present in the input data. The selection criterion may comprise one of a topmost category including a class value having a highest associated probability, top N categories including N class values having highest associated probabilities, bottom N categories including N class values having lowest associated probabilities, or a set of select class values specified by the user and their associated probabilities and ranks.

In one aspect of the present invention, the step of generating multi-category apply output may further comprise the steps of receiving the input data in a non-transactional format and preparing the input data for scoring in the non-transactional format to generate input data tables including active attributes and source attributes. The method may further comprise the step of validating the received input data to ensure active attributes and a target attribute specified for the data mining model are present in the received input data and the source attributes specified for the multi-category apply output are present in the input data. The selection criterion may comprise one of a topmost category including a class value having a highest associated probability, top N categories including N class values having highest associated probabilities, bottom N categories including N class values having lowest associated probabilities, or a set of select class values specified by the user and their associated probabilities and ranks.

In one aspect of the present invention, the step of generating multi-category apply data may further comprise the steps of receiving a portion of the input data for scoring in a transactional format and a portion of the input data in a non-transactional format, preparing the portion of the input data in the transactional format to generate input data tables including active attributes and source attributes and preparing the portion of the input data in the non-transactional format to generate input data tables including active attributes and source attributes. The method may further comprise the step of validating the received scoring data to ensure active attributes and a target attribute specified for the data mining model are present in the received input data and the source attributes specified for the multi-category apply output are present in the input data. The selection criterion may comprise one of a topmost category including a class value having a highest associated probability, top N categories including N class values having highest associated probabilities, bottom N categories including N class values having lowest associated probabilities, or a set of select class values specified by the user and their associated probabilities and ranks.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
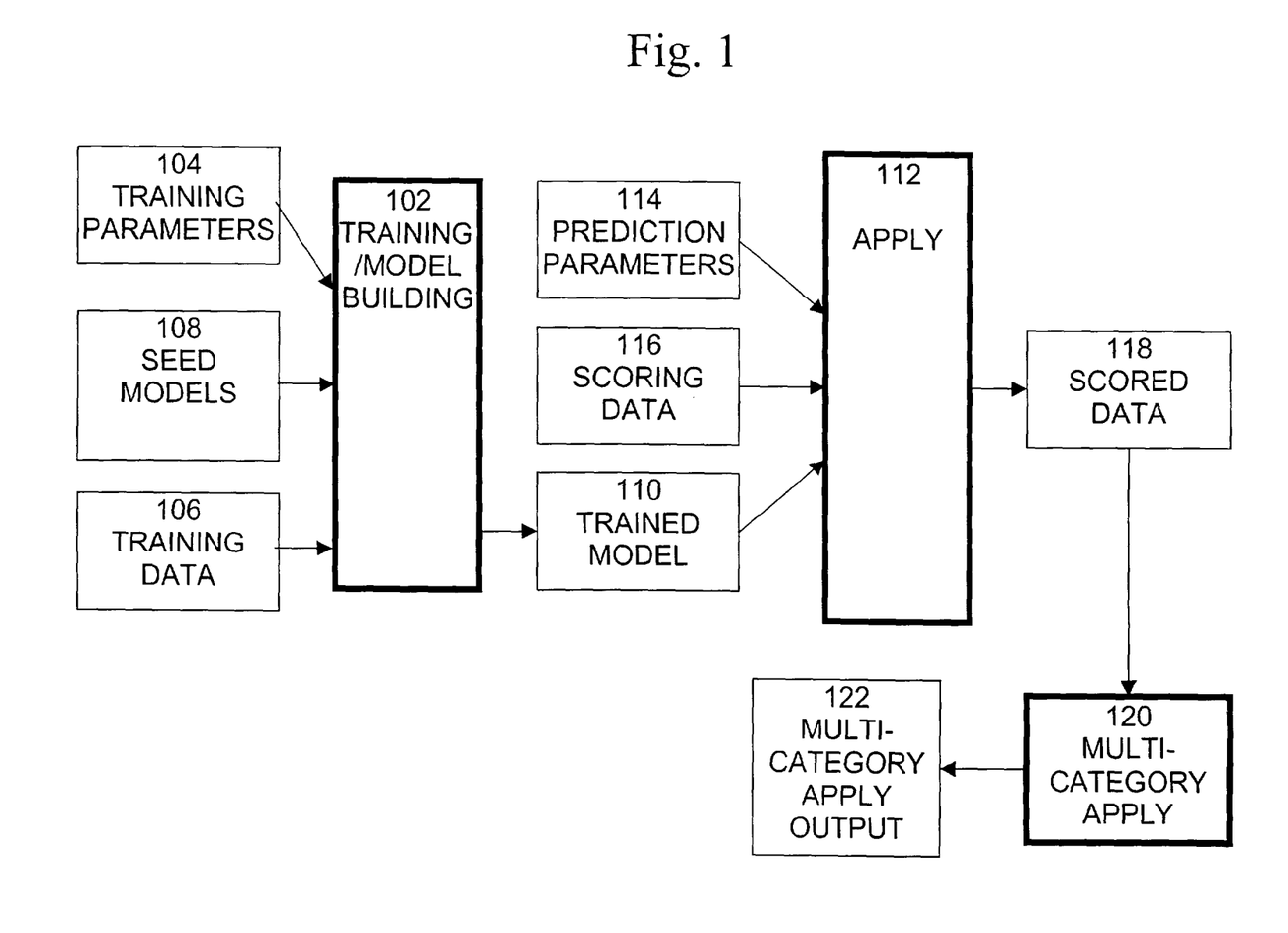
FIG. 1 is an exemplary data flow diagram of a data mining process, including model building and scoring of models (model apply), according to the present invention.

An exemplary data flow diagram of a data mining process, including model building (supervised learning or unsupervised) and scoring of models (model apply), is shown in FIG. 1. The training/model building step 102 involves generating the models that are used to perform data mining recommendation and prediction. Supervised learning is a process of building/finding a model in terms of the given target values. The techniques include classification, neural networks and Bayesian Networks, where the target is used to guide the process of building a model. Since there exists a guide that "supervises" the model building process, this process is called supervised learning. On the other hand, other techniques, such as clustering and association rules, are used to find patterns or rules hidden in the data without the guide of the target. In general, such techniques focus on the characteristics of the data itself.

The inputs to training/model building step 102 include training parameters 104, training data 106, and seed models 108. Seed models 108 include mining models that are used as input for incremental learning. The training/model building step 102 include algorithms that process the training data 106 in order to actually build the models. Training parameters 104 are parameters, described above, that are input to the data-mining model building algorithms to control how the algorithms build the models. Training data 106 is data that is input to the algorithms and which is used to actually build the models.

Training/model building step 102 executes the data mining model building algorithms using the training parameters 104 and training data 106 to build a data mining model, and generates trained model 110. Trained model 110 may also be evaluated and adjusted in order to improve the quality, i.e. prediction accuracy, of the model. Trained model 110 is then encoded in an appropriate format and deployed for use in making predictions or recommendations.

Apply (scoring) step 112 involves using the deployed trained model 110 to make predictions or recommendations based on new input data for scoring 116. If the model type is supervised and once a model is built on a set of records whose class values are known a priori, it can be used to predict (or score) the class value of a record whose class is not known. This operation is also known as apply because the new records are applied to the model. The result of apply operation includes the scores (predicted class values) with associated measures such as probability and rank. For example, an auto insurance company builds a classification model that predicts the class of their customer to determine the customer's insurance premium. Such model would classify the customers into a predetermined set of categories such as low, medium, and high risk. However, the predicted category (the class of a customer) may not be correct in some cases. This is the reason the prediction is associated with a probability. Sometimes the errors involved with the supervised models are accepted as an inherent risk of the business and are one of the areas in the research community that has caught lots of attention from the researchers.

For example, a user can score a classification model that is produced by the Naive Bayes algorithm. The data to be scored must have attributes compatible with the training data that was used for model building. Specifically, it must have a superset of attributes with the same respective data types and/or a suitable mapping. The result of apply operation is placed in the location specified by the user.

Trained model 110, prediction parameters 114, and scoring data 116 are input to apply step 112. Trained models 110 include information defining the model that was generated by model building step 102. Prediction parameters 114 are parameters that are input to the apply step 112 to transform the scoring data 116 against trained model 110 and are input to the selection and prediction/recommendation step 120 to control the selection of the scored data 118 and the generation of predictions and recommendations 120. Depending on the implementation, the apply step 112 and the generation of predictions and recommendations may merge into a single step where the scored data 118 is handled transparently.

Scoring data 116 is processed according to trained model 110, as controlled by prediction parameters 114, to generate one or more scores for each row of data in scoring data 116. The scores for each row of data indicate how closely the row of data matches attributes of the model, how much confidence may be placed in the prediction, how likely each output prediction/recommendation to be true, and other statistical indicators. Scored data 118 is output from scoring step 112 and includes predictions or recommendations, along with corresponding probabilities for the scored data.

Scored data 118 is input to multi-category apply step, which evaluates the probabilities associated with the class values and selects a plurality of class values and their associated measures, such as probabilities. The selected class values are those meeting the selection criteria presented in prediction parameters 114. The selection criteria may be defined by desired results data and/or by predefined or default criteria included in selection/generation step 120. In addition, the selection criteria may include a limit on the number of class values that are to be selected, or may indicate that the class values are to be sorted based on their associated probabilities. The selected class values, which are included in multi-category apply output 122, are output from step 120.

A target attribute is a data mining attribute whose value is to be predicted by applying the model. Each value that the target attribute can have is called class, and the cardinality of the class values is usually low. The lowest cardinality is two, a case of which is specifically called binary target and typically constitutes a major part of the applications.

Each class is represented as a category. In other words, a category is a discrete value or a set of values of the target attribute. There can be many different ways of describing a target. For example, if age is the target attribute then there can be following types of category definitions:

1. Binary target: If the goal is to predict whether the given person can vote, the target values will be divided into two based on this question: Is age less than 21? Again, the categories can be represented in many ways: yes/no, true/false, 0/1, child/adult, non-voter/voter, etc.
2. Individual value: Each value of the domain becomes a class value. The goal of this application is to predict the age of a person. One can decide upon the categories such that each number between 0 and 150 is a category. In this case, the number 150 is arbitrarily chosen, based on the knowledge that the maximum age of human being cannot exceed 150. A special value may be necessary in order to handle rare cases where someone's age is over 150 (outlier handling). For example, a value 151 may imply any age greater than 150.
3. Value set: Each category represents a group of ages. For example, the age groups (1-18), (18-25), (25-35) are represented as 1, 2, 3, respectively. This would make more sense in target marketing than having as many categories as ages.

A score/prediction is a category associated with probability as the result of applying to a supervised model a record whose target value is unknown. A single-target apply operation produces the target value (or category) whose probability is the highest among the all target values.

Figure 2:
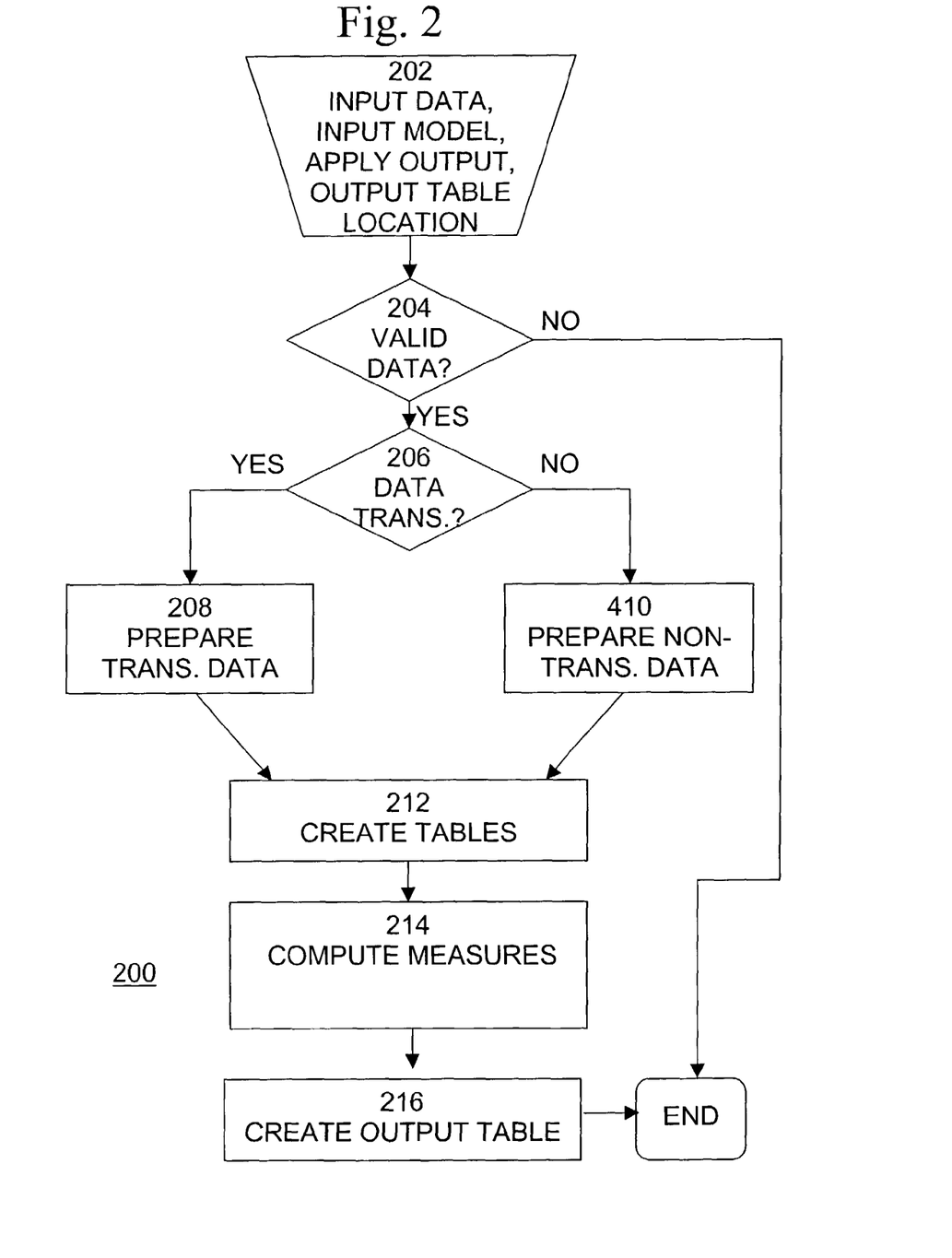
FIG. 2 is a process for multi-category support for the apply operation step shown in FIG. 1.

A process 200 for multi-category support for the apply operation, according to the present invention, is shown in FIG. 2. Process 200 begins with step 202, in which a number of steps shown in FIG. 1 are performed. In particular, trained model 110, prediction parameters 114, and scoring data 116 are input to scoring step 112. Scoring data 116 is processed according trained model 110, as controlled by prediction parameters 114, to generate one or more scores for each row of data in scoring data 116. These scores are included in the apply output and are typically stored in an apply output data table. The location of this apply output data table is typically used to access the data included in the table.

In step 204, it is determined whether the data included in the apply output data table is valid. For example, all the active attributes and target attribute specified for the data mining model must be present in the input data. Likewise, all the source attributes specified for the multi-category apply output must also be present in the input data. The source attributes are columns in the input table that are specified as appearing in the output table and are used to uniquely associate output rows to input rows. If the data included in the apply output data table is not valid, then that data cannot be processed and process 200 ends. If the data included in the apply output data table is valid, then process 200 continues with step 206, in which it is determined whether the data included in the apply output data table is in a transactional format. In a transactional format, each significant piece of data is stored in its own row or entry in the data table. Several rows of data may be needed to form one usable piece of information, and any such relationship is indicated in the data entries.

If, in step 206, it is determined that the data the data included in the apply output data table is in a transactional format, then process 200 continues with step 208, in which the transactional data is prepared for further processing. Typical data preparation for transactional data includes extraction of source attributes to appear as part of the apply output table, filtering of inactive attributes, any discretization or normalization to transform the data for the apply algorithm to work with, and any conversion of the data to non-transactional form required by the apply algorithm.

If, in step 206, it is determined that the data the data included in the apply output data table is not in a transactional format, then process 200 continues with step 210, in which the non-transactional data is prepared for further processing. Typical data preparation for non-transactional data includes extraction of source attributes to appear as part of the apply output table, filtering of inactive attributes, any discretization or normalization to transform the data for the apply algorithm to work with, and any conversion of the data to transactional form required by the apply algorithm.

Figure 5:
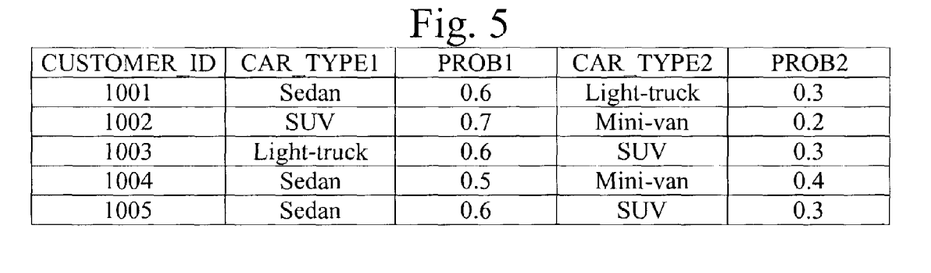
FIG. 5 is an exemplary table of apply output for a supervised model that contains a source attribute, the top 2 predictions and their probabilities.

In step 212, the data tables to be used to compute the predictions and associated measures are derived from the input data. In step 214, the measures associated with the predicted categories as specified in the prediction parameters 114 are calculated. Such measures include probability of the prediction, its rank within the entire class values used for prediction, and quality of fit and distance in case of clustering models. In step 216, the multi-category apply output table/view is created. This table is created with the user specified name at the user specified location in the user specified format. An example of apply output table is shown in FIG. 5.

An example of the usage of multi-category apply, according to the present invention, is described below. An online retailer recently developed a recommendation engine that provides its customers with a recommendation for a given number of products, based on the customer profile, purchase history and click stream data. Since the number of products is very high, they would have to generate as many single-category apply outputs as the number of products they want to recommend, if they did not use multi-category apply. This would cause not only a serious maintenance problem and delays, but also require significant resources. Another problem is that it is impossible to produce an output that contains a specified number of products with specified probabilities, such as those products whose probabilities are the lowest.

This problem can be avoided with the use of multi-category apply. Once a model is built, a predetermined number of products can be specified to appear in the output table together with their associated probabilities. Alternatively, an analyst will be able to get a number of products with specified probabilities.

Figure 3:
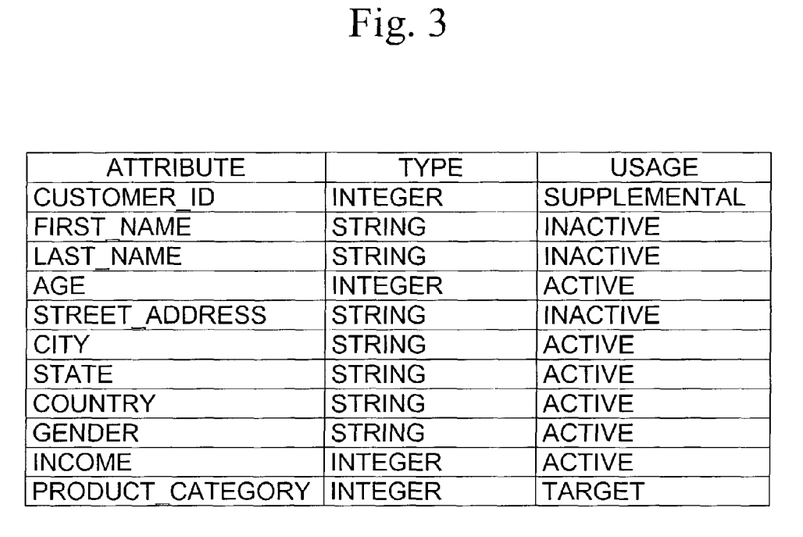
FIG. 3 is an exemplary table of data mining attributes of training data used in building a supervised mining model.

An exemplary table of data mining attributes of training data used in building a supervised data mining model is shown in FIG. 3. This model may be used to personalize product recommendations for customers. An apply operation is to be performed on the model to find some products that a customer would most likely buy. Suppose, in this example, that the target attribute has five categories: very inexpensive products (1), inexpensive products (2), average cost products (3), expensive products (3), and very expensive products (5).

Examples of typical output table formats that may be generated include:
  The topmost Category—the user wants to find the most likely category for customers to buy.
  Top N Categories—the user wants to find the top N most likely categories for customers to buy.
  Bottom N Categories—the user wants to find the top N least likely categories for customers to buy
  All Categories probabilities—the user can generate an output table with all the categories with their probabilities.

An example of an apply output table is shown in FIG. 5, where the top two predictions and their probabilities are associated with customer identifiers. In this example, an automobile dealer wants to predict two car types a customer is most likely to buy. The apply output table include five columns: customer identifier, the car type the customer most likely to buy, the probability for the car type the customer is most likely to buy, second car type as an alternative, and the probability of the second car type. Based on the prediction, the customer with identifier 1001 is deemed to want to buy a sedan with 60% probability and a light truck with 30% probability. Based on such predictions, the dealer may run a campaign to promote sales of sedans and SUVs because these car types appear to be the most wanted by the customers.

Figure 4:
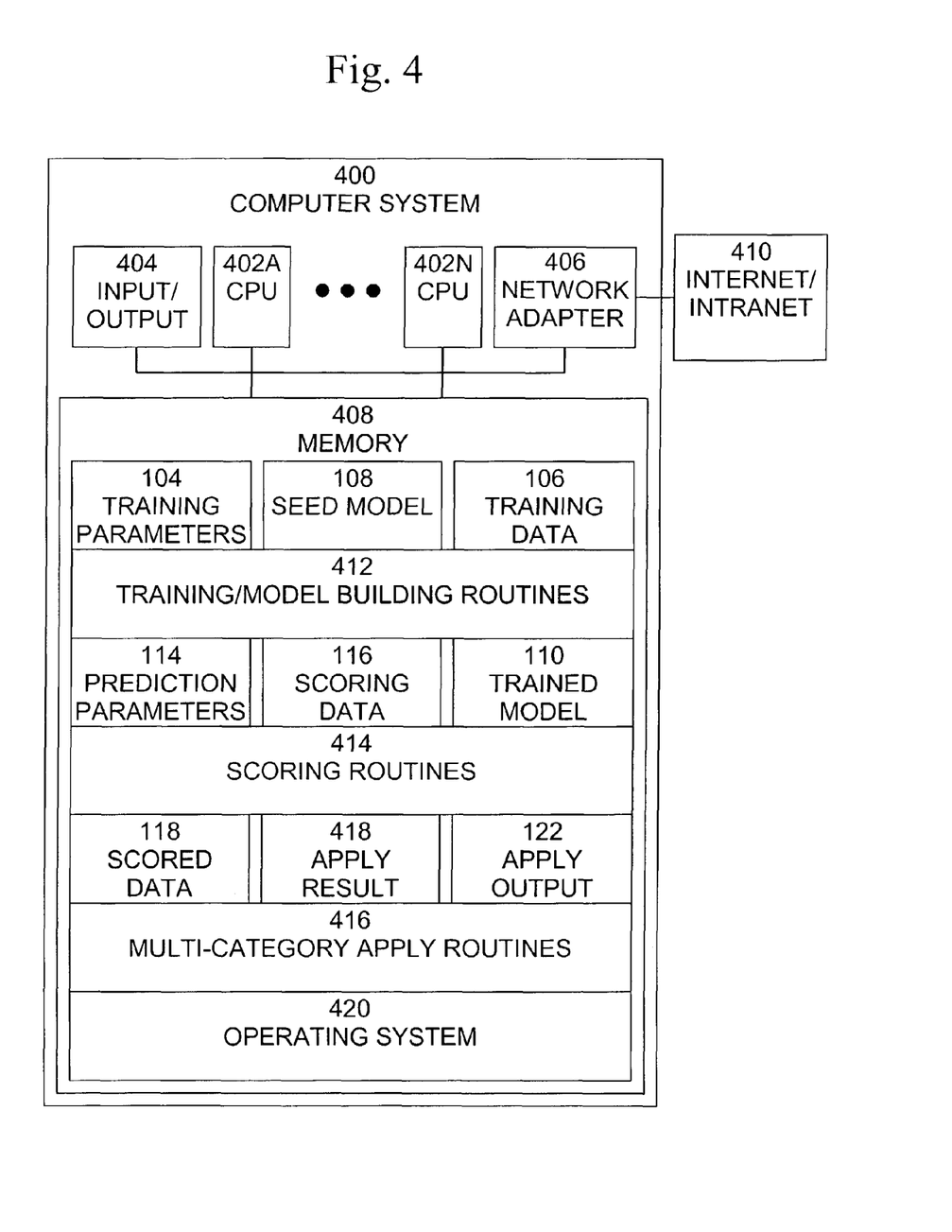
FIG. 4 is an exemplary block diagram of a data mining system in which the multi-category apply of the present invention may be implemented.

An exemplary block diagram of a data mining system 400, in which the multi-category apply of the present invention may be implemented. System 400 is typically a programmed general-purpose computer system, such as a personal computer, workstation, server system, and minicomputer or mainframe computer. System 400 includes one or more processors (CPUs) 402A-402N, input/output circuitry 404, network adapter 406, and memory 408. CPUs 402A-402N execute program instructions in order to carry out the functions of the present invention. Typically, CPUs 402A-402N are one or more microprocessors, such as an INTEL PENTIUM® processor. FIG. 4 illustrates an embodiment in which System 400 is implemented as a single multi-processor computer system, in which multiple processors 402A-402N share system resources, such as memory 408, input/output circuitry 404, and network adapter 406. However, the present invention also contemplates embodiments in which system 400 is implemented as a plurality of networked computer systems, which may be single-processor computer systems, multi-processor computer systems, or a mix thereof.

Input/output circuitry 404 provides the capability to input data to, or output data from, database/System 400. For example, input/output circuitry may include input devices, such as keyboards, mice, touchpads, trackballs, scanners, etc., output devices, such as video adapters, monitors, printers, etc., and input/output devices, such as, modems, etc. Network adapter 406 interfaces database/System 400 with Internet/intranet 410. Internet/intranet 410 may include one or more standard local area network (LAN) or wide area network (WAN), such as Ethernet, Token Ring, the Internet, or a private or proprietary LAN/WAN.

Memory 408 stores program instructions that are executed by, and data that are used and processed by, CPU 402 to perform the functions of system 400. Memory 408 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

In the example shown in FIG. 4, memory 408 includes training parameters 104, training data 106, seed models 108 to be used for incremental model building, trained model 110, prediction parameters 114, scoring data 116, scored data 118, apply output 122, training/model building routines 412, scoring routines 414, multi-category apply routines 416, apply data 418, and operating system 420. Training parameters 104 are parameters, described above, that are input to the data-mining model building algorithms to control how the algorithms build the models. Training data 106 is data that is input to the algorithms and which is used to actually build the models. Seed models 108 are to be used for incremental learning by which existing models are used to derive a new model without having to waste the effort and resource spent on building the seed models. Training/model routines 412 are software routines that execute the data mining model building algorithms, initialize the algorithms using the training parameters 104, process training data 106 using the algorithms to build the model, and generate trained model 110. Trained models 110 include information defining the model that was generated by training/model routines 412.

Prediction parameters 114 are parameters that are input to the scoring routines 414 to control the scoring of scoring data 116 against trained model 110. Scoring routines 414 are software routines that process coring data 116 according to trained model 110, as controlled by prediction parameters 114, to generate one or more scores for each row of data in scoring data 116. The scores for each row of data indicate how closely the row of data matches attributes of the model, how much confidence may be placed in the prediction, how likely each output prediction/recommendation to be true, and other statistical indicators. Scored data 118 is output from scoring routines 414 and includes predictions or recommendations, along with corresponding probabilities for the scored data.

Multi-category apply routines 416 are software routines that evaluate the probabilities associated with the class values in scored data 118 and select a plurality of class values and their associated probabilities. The selected class values are those having probabilities meeting the selection criteria. The selection criteria may include a limit on the number of class values that are to be selected, or may indicate that the class values are to be sorted based on their associated probabilities. Multi-category apply output 122 includes the selected class values and their associated probabilities, which are output from multi-category apply routines 416.

As shown in FIG. 4, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, Ram, and CD-ROM's.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method for multi-category apply in a data mining system, the method comprising the steps of:
    receiving scoring data including a plurality of rows of data representing real-world quantities applied to a data mining model, including ranks, wherein the scoring data is received in a transactional format and is prepared to generate input data tables including active attributes and source attributes; and
    generating a plurality of categories, each category representing a discrete value or a set of values of a class by generating multi-category apply data, the multi-category apply data generated by:
    generating input data tables including active attributes and source attributes;
    evaluating measures including probabilities and ranks of categories of a target attribute to determine those meeting a selection criterion for supervised models;
    evaluating measures including probabilities, ranks, quality of fit, and distance of predicted values, to determine those meeting the selection criterion, for unsupervised models; and
    generating an output data table including a plurality of class values of the target attribute meeting the selection criterion and their associated measures including probabilities, ranks, quality of fit and distance based on the received scoring data.

2. The method of claim 1, further comprising the step of:
    validating the received scoring data to ensure active attributes and a target attribute specified for the data mining model are present in the received scoring data and the source attributes specified for the multi-category apply output are present in the input data.

3. The method of claim 2, wherein the selection criterion comprises one of:
    a topmost category including a class value or predicted value having a highest associated probability, top N categories including N class values having highest associated probabilities, bottom N categories including N class values having lowest associated probabilities, or all categories including all class values with associated probabilities.

4. The method of claim 1, wherein the step of generating multi-category apply data further comprises the steps of:
    receiving the scoring data in a non-transactional format; and
    preparing the scoring data in the non-transactional format to generate input data tables including active attributes and source attributes.

5. The method of claim 4, further comprising the step of:
    validating the received scoring data to ensure active attributes and a target attribute specified for the data mining model are present in the received scoring data and the source attributes specified for the multi-category apply output are present in the input data.

6. The method of claim 5, wherein the selection criterion comprises one of:
    a topmost category including a class value or predicted value having a highest associated probability, top N categories including N class values having highest associated probabilities, bottom N categories including N class values having lowest associated probabilities, or all categories including all class values with associated probabilities.

7. The method of claim 1, wherein the step of generating multi-category apply data further comprises the steps of:
    receiving a portion of the scoring data in a transactional format and a portion of the scoring data in a non-transactional format;
    preparing the portion of the scoring data in the transactional format to generate input data tables including active attributes and source attributes; and
    preparing the portion of the scoring data in the non-transactional format to generate input data tables including active attributes and source attributes.

8. The method of claim 7, further comprising the step of:
    validating the received scoring data to ensure active attributes and a target attribute specified for the data mining model are present in the received scoring data and the source attributes specified for the multi-category apply output are present in the input data.

9. The method of claim 8, wherein the selection criterion comprises one of:
    a topmost category including a class value or predicted value having a highest associated probability, top N categories including N class values having highest associated probabilities, bottom N categories including N class values having lowest associated probabilities, or all categories including all class values with associated probabilities.

10. A system for multi-category apply in a data mining system comprising:
    a processor operable to execute computer program instructions;
    a memory operable to store computer program instructions executable by the processor; and
    computer program instructions stored in the memory and executable to perform the steps of:
    receiving scoring data including a plurality of rows of data representing real-world quantities applied to a data mining model including quality of fit, wherein the scoring data is received in a transactional format and is prepared to generate input data tables including active attributes and source attributes; and
    selecting a plurality of categories, each category representing a discrete value or a set of values of a class by generating multi-category apply data, the multi-category apply data generated by:
    generating input data tables including active attributes and source attributes;
    evaluating measures including probabilities and ranks of categories of a target attribute to determine those meeting a selection criterion for supervised models;
    evaluating measures including probabilities, ranks, quality of fit, and distance of predicted values to determine those meeting the selection criterion for unsupervised models; and
    generating an output data table including a plurality of class values of the target attribute meeting the selection criterion and their associated measures including probabilities, ranks, quality of fit, and distance based on the received scoring data.

11. The system of claim 10, further comprising the step of: validating the received scoring data to ensure active attributes and a target attribute specified for the data mining model are present in the received scoring data and the source attributes specified for the multi-category apply output are present in the input data.

12. The system of claim 11, wherein the selection criterion comprises one of:
a topmost category including a class value or predicted value having a highest associated probability, top N categories including N class values having highest associated probabilities, bottom N categories including N class values having lowest associated probabilities, or all categories including all class values with associated probabilities.

13. The system of claim 10, wherein the step of generating multi-category apply data further comprises the steps of:
receiving the scoring data in a non-transactional format; and
preparing the scoring data in the non-transactional format to generate input data tables including active attributes and source attributes.

14. The system of claim 13, further comprising the step of: validating the received scoring data to ensure active attributes and a target attribute specified for the data mining model are present in the received scoring data and the source attributes specified for the multi-category apply output are present in the input data.

15. The system of claim 14, wherein the selection criterion comprises one of:
a topmost category including a class value predicted value having a highest associated probability, top N categories including N class values having highest associated probabilities, bottom N categories including N class values having lowest associated probabilities, or all categories including all class values with associated probabilities.

16. The system of claim 10, wherein the step of generating multi-category apply data further comprises the steps of:
receiving a portion of the scoring data in a transactional format and a portion of the scoring data in a non-transactional format;
preparing the portion of the scoring data in the transactional format to generate input data tables including active attributes and source attributes; and
preparing the portion of the scoring data in the non-transactional format to generate input data tables including active attributes and source attributes.

17. The system of claim 16, further comprising the step of: validating the received scoring data to ensure active attributes and a target attribute specified for the data mining model are present in the received scoring data and the source attributes specified for the multi-category apply output are present in the input data.

18. The system of claim 17, wherein the selection criterion comprises one of:
a topmost category including a class value predicted value having a highest associated probability, top N categories including N class values having highest associated probabilities, bottom N categories including N class values having lowest associated probabilities, or all categories including all class values with associated probabilities.

19. A computer program product for multi-category apply in a data mining system comprising:
a computer readable medium encoded with computer program instructions, recorded on the computer readable medium, executable by a processor, for performing the steps of
receiving scoring data including scores of rows of data representing real-world quantities applied to a data mining model, including distance, wherein the scoring data is received in a transactional format and is prepared to generate input data tables including active attributes and source attributes; and
selecting a plurality of categories, each category representing a discrete value or a set of values of a class by generating multi-category apply data, the multi-category apply data generated by:
generating input data tables including active attributes and source attributes;
evaluating measures including probabilities and ranks of categories of a target attribute to determine those meeting a selection criterion for supervised models; and
evaluating measures including probabilities, ranks, quality of fit, and distance of predicted values to determine those meeting the selection criterion for unsupervised models; and
generating an output data table including a plurality of class values of the target attribute meeting the selection criterion and their associated measures including probabilities, ranks, quality of fit and distance based on the received scoring data.

20. The computer program product of claim 19, further comprising the step of:
validating the received scoring data to ensure active attributes and a target attribute specified for the data mining model are present in the received scoring data and the source attributes specified for the multi-category apply output are present in the input data.

21. The computer program product of claim 20, wherein the selection criterion comprises one of:
a topmost category including a class value predicted value having a highest associated probability, top N categories including N class values having highest associated probabilities, bottom N categories including N class values having lowest associated probabilities, or all categories including all class values with associated probabilities.

22. The computer program product of claim 19, wherein the step of generating multi-category apply data further comprises the steps of:
receiving the scoring data in a non-transactional format; and
preparing the scoring data in the non-transactional format to generate input data tables including active attributes and source attributes.

23. The computer program product of claim 22, further comprising the step of:
validating the received scoring data to ensure active attributes and a target attribute specified for the data mining model are present in the received scoring data and the source attributes specified for the multi-category apply output are present in the input data.

24. The computer program product of claim 23, wherein the selection criterion comprises one of:
a topmost category including a class value predicted value having a highest associated probability, top N categories including N class values having highest associated probabilities, bottom N categories including N class values having lowest associated probabilities, or all categories including all class values with associated probabilities.

25. The computer program product of claim 19, wherein the step of generating multi-category apply data further comprises the steps of:
    receiving a portion of the scoring data in a transactional format and a portion of the scoring data in a non-transactional format;
    preparing the portion of the scoring data in the transactional format to generate input data tables including active attributes and source attributes; and
    preparing the portion of the scoring data in the non-transactional format to generate input data tables including active attributes and source attributes.

26. The computer program product of claim 25, further comprising the step of:
    validating the received scoring data to ensure active attributes and a target attribute specified for the data mining model are present in the received scoring data and the source attributes specified for the multi-category apply output are present in the input data.

27. The computer program product of claim 26, wherein the selection criterion comprises one of:
    a topmost category including a class value predicted value having a highest associated probability, top N categories including N class values having highest associated probabilities, bottom N categories including N class values having lowest associated probabilities, or all categories including all class values with associated probabilities.

28. A computer-implemented method for multi-category apply in a data mining system, comprising:
    receiving scoring data including a plurality of rows of data representing real-world quantities applied to a data mining model and associated measures, including quality of fit, wherein the scoring data is received in a transactional format and is prepared to generate input data tables including active attributes and source attributes; and
    generating a plurality of categories, each category representing a discrete value or a set of values of a class by generating multi-category apply data including a plurality of class values by generating multi-category apply data, the multi-category apply data generated by:

generating input data tables including active attributes and source attributes;

evaluating measures including probabilities and ranks of categories of a target attribute to determine those meeting a selection criterion for supervised models; and evaluating measures including probabilities, ranks, quality of fit, and distance of predicted values to determine those meeting the selection criterion for unsupervised models; and generating an output data table including a plurality of class values of the target attribute meeting the selection criterion and their associated measures including probabilities, ranks, quality of fit and distance based on the received scoring data.

* * * * *

UNITED STATES PATENT AND TRADEMARK OFFICE
CERTIFICATE OF CORRECTION

| | | |
|---|---|---|
| PATENT NO. | : 7,882,127 B2 | Page 1 of 1 |
| APPLICATION NO. | : 10/419922 | |
| DATED | : February 1, 2011 | |
| INVENTOR(S) | : Venkayala et al. | |

It is certified that error appears in the above-identified patent and that said Letters Patent is hereby corrected as shown below:

In column 6, line 58, after "buy" insert -- . --.

In column 7, line 46, delete "electromechanical" and insert -- electro-mechanical --, therefor.

In column 9, line 6, delete "Ram," and insert -- RAM, --, therefor.

In column 12, line 4, in Claim 19, after "of" insert -- : --.

In column 14, line 3, in Claim 28, delete "model and associated measures," and insert -- model, --, therefor.

Signed and Sealed this
Fourth Day of October, 2011

David J. Kappos
*Director of the United States Patent and Trademark Office*